July 24, 1951  G. W. MILLER  2,561,446
METHOD OF IMPREGNATING TRANSFORMERS
Filed July 26, 1946
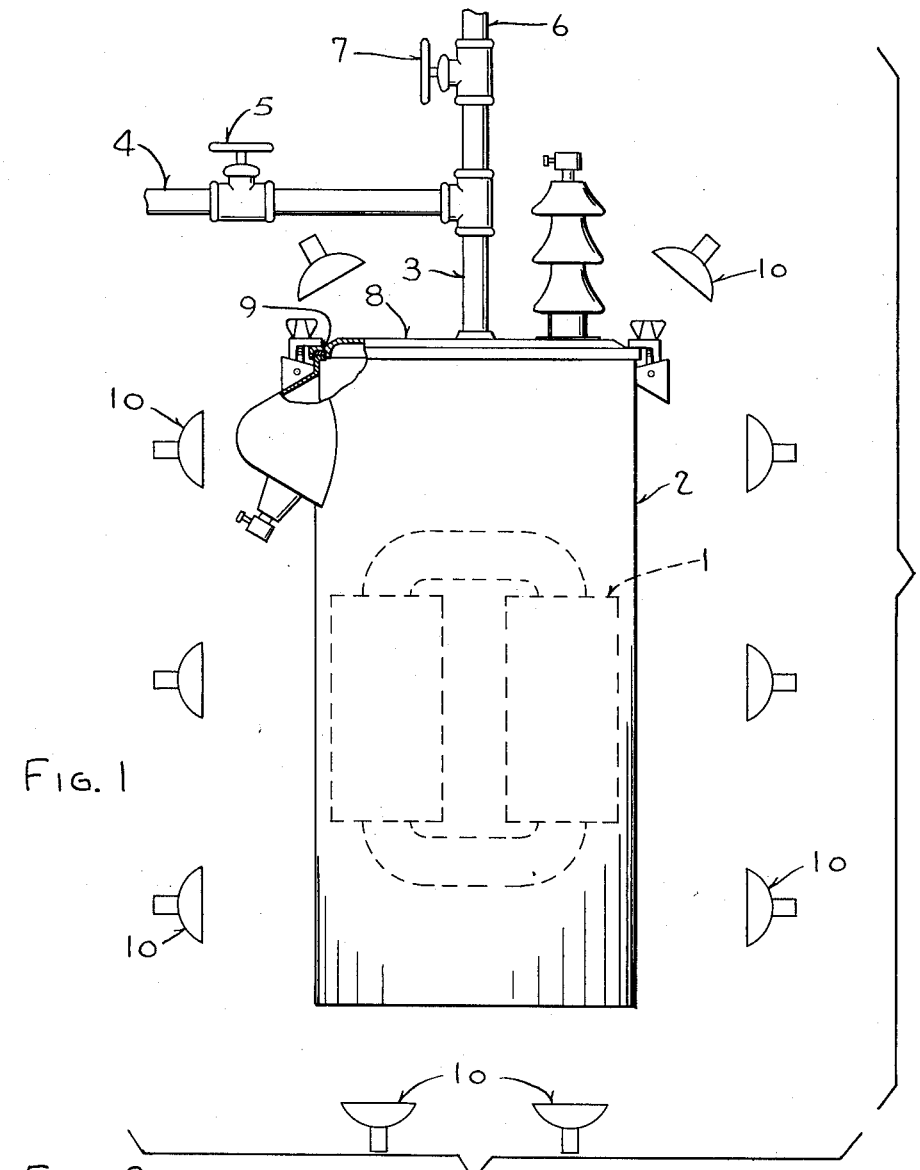
INVENTOR.
GEORGE W. MILLER
BY
ATTORNEY Patented July 24, 1951

2,561,446

UNITED STATES PATENT OFFICE 2,561,446

METHOD OF IMPREGNATING TRANSFORMERS

George W. Miller, Zanesville, Ohio, assignor to McGraw Electric Company, a corporation of Delaware Application July 26, 1946, Serial No. 686,490

1 Claim. (Cl. 29—155.56)

This invention relates to a method of impregnating transformers.

In impregnating transformers considerable difficulty has been encountered in thoroughly drying out the transformer and in preventing the formation of voids which later will give considerable trouble in the operation of the transformer, particularly distribution or high voltage transformers.

Objects of this invention are to provide a novel method of impregnating and drying out transformers which insures a thorough drying out of the transformer and which prevents the formation of voids. The method is applicable to transformers installed in their own casings or housings.

Further objects are to provide a method of impregnating transformers in which the transformer mounted in its own casing or tank is heated both internally and externally and is thoroughly dried out, the casing being hermetically sealed and a vacuum applied to the casing to remove the air and moisture from the transformer while it is being heated.

A particular object of this invention is to provide a method whereby the encased transformer is heated internally by the $I^2R$ losses in certain windings of the transformer, one of the windings being supplied with alternating current and the remaining windings being short-circuited, and at the same time to provide externally applied heat so as to prevent condensation on the interior walls of the transformer tank or casing and also to keep the temperature gradient between the several parts of the transformer as low as possible throughout the process.

An embodiment of the invention is shown in the accompanying drawings, in which—

Figure 1 is a view of a transformer connected up so that the method contemplated by this invention may be followed.

Figure 2 is a wiring diagram of the transformer showing temporary connections while the transformer is being processed.

In practicing this invention, the transformer indicated generally by the reference character 1 which is hermetically sealed in its own permanent tank or casing 2 is connected by means of a pipe 3 with a source of vacuum 4, a valve 5 being provided. The pipe 3 is also connected to a source of gas-free oil by means of the pipe 6, a control valve 7 for the oil being provided.

It is to be noted that the pipe 3 is screwed or otherwise attached at any suitable aperture in the cover 8 of the transformer. The cover 8 is left in place and is clamped down against the sealing gasket 9 so as to provide a hermetically sealed unit.

A plurality of heating means such as the infrared bank of lamps or heating units 10 surround the exterior of the casing 2 and furnish heat exteriorly of the casing, the heat being conducted inwardly. In addition to this, the transformer is internally heated by short-circuiting all but one of its windings, as shown in Figure 2. For instance, the secondary windings 11 may be short-circuited and the primary winding 12 may be connected to a suitable source of alternating current so as to adjust the load of the transformer to the desired point to produce the desired amount of heat internally of the transformer due to the $I^2R$ and other losses.

While the transformer is heated, both externally and internally, the valve 7 is closed and the valve 5 is open so that a vacuum is produced within the tank or casing 1. This vacuum may be as low as is practicable. It has been found that an absolute pressure of less than one inch of mercury is satisfactory. This process is continued for one or more hours until the transformer is thoroughly dried out.

It is to be noted that the temperature is maintained at such a point that it will not damage any portion of the transformer or its housing. The temperature may be maintained at 100° C. or even higher for a limited time. The external heating prevents condensation on the inside of the casing which would later collect in the bottom of the tank and mix with the oil which is subsequently allowed to flow into the casing in a manner hereinafter described.

It is to be noted particularly that the method of heating the transformer, both internally and externally, provides the minimum temperature gradient between the several parts of the transformer. The externally applied heat prevents radiation of the heat supplied internally of the apparatus. The externally applied heat must be so regulated that it is not too severe so that there will be no damage to the paint usually applied to the exterior of the tank or casing of the transformer. The heating of the transformer and its casing and the evacuation which draws off the air and moisture from the transformer and from the interior of the casing continues until the transformer is thoroughly dried out. Thereafter the valve 5 is closed and the valve 7 opened and gas-free oil is allowed to flow into the casing and to permeate all portions of the transformer so that there will be no voids or empty pockets formed in any portion of the transformer. It is to be noted that atmospheric pressure on the upper surface of the oil forces the oil into all portions of the transformer. Subsequently, the pipe 3 is removed and the opening into which it was screwed closed by a suitable plug or cap, not shown.

It will be seen that a novel method has been provided for drying and impregnating transformers which are installed in their own permanent casings. This method also utilizes the permanent casings of the transformers as the vacuum chambers, so that the transformer does not have to be subsequently handled and subsequently placed in a casing. This method provides a way of insuring complete drying of the transformer prior to the admission of gas-free oil. Also the method insures not only the heating externally of the casing and the subsequent heating of the transformer by radiation or conduction from the interior of the casing to the transformer proper, but also provides internal heating of the transformer itself so as to minimize the temperature gradient between the several parts of the apparatus. The method also avoids any possible chance of condensation of moisture internally of the casing but instead insures the removal of moisture from all parts of the apparatus.

Although this invention has been described in considerable detail, it is to be understood that such description is intended as illustrative rather than limiting, as the invention may be variously embodied and is to be interpreted as claimed.

I claim:

The method of impregnating transformers which are subsequently sealed in permanent casings, said method comprising placing the transformer in the permanent casing, temporarily sealing the casing, producing a vacuum within the casing, electrically loading the transformer to cause heating thereof, applying heat to the exterior of the casing, maintaining the heating and vacuum until the transformer is thoroughly dry, allowing oil to flow into the casing, breaking the vacuum so that atmospheric pressure acts upon the upper surface of the oil and forces the oil into all the interstices of the transformer and prevents the formation of voids, leaving the transformer in the permanent casing, and subsequently sealing the permanent casing.

GEORGE W. MILLER.

REFERENCES CITED

The following references are of record in the file of this patent:

UNITED STATES PATENTS

| Number | Name | Date |
|---|---|---|
| 691,675 | Thomson | Jan. 21, 1902 |
| 1,163,342 | Hurley et al. | Dec. 7, 1915 |
| 1,902,575 | Nichols | Mar. 21, 1933 |
| 2,063,346 | Scott et al. | Dec. 8, 1936 |
| 2,120,816 | Schnoll | June 14, 1938 |